(No Model.)
G. M. MORRIS.
STRAP HOLDER FOR PARCELS.
No. 424,806. Patented Apr. 1, 1890.
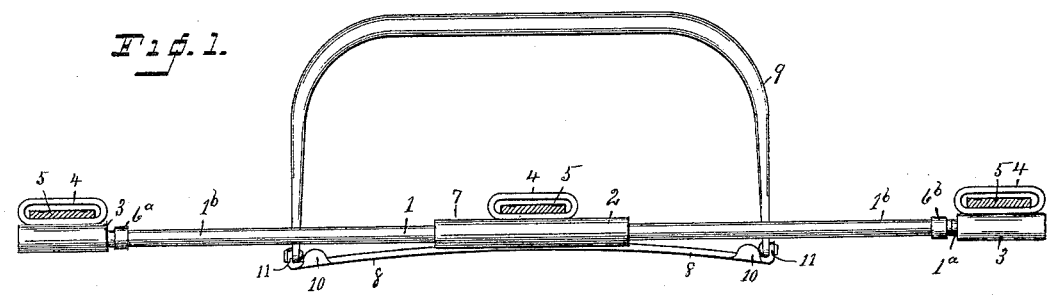
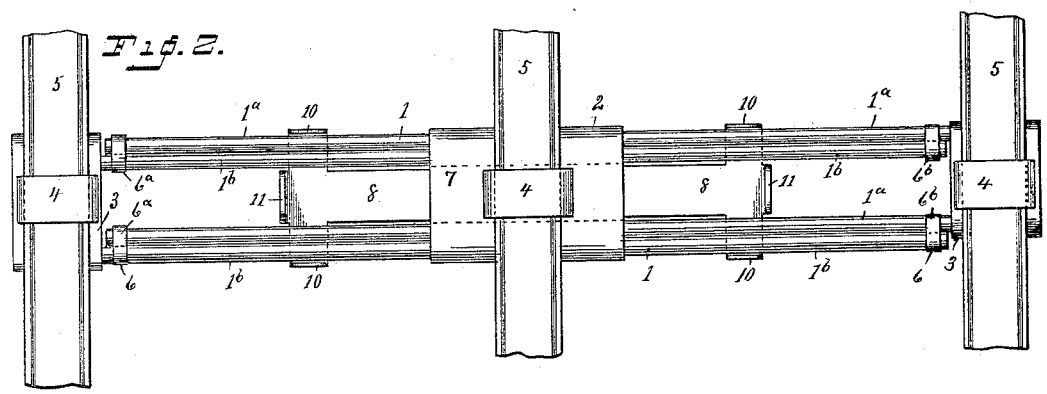
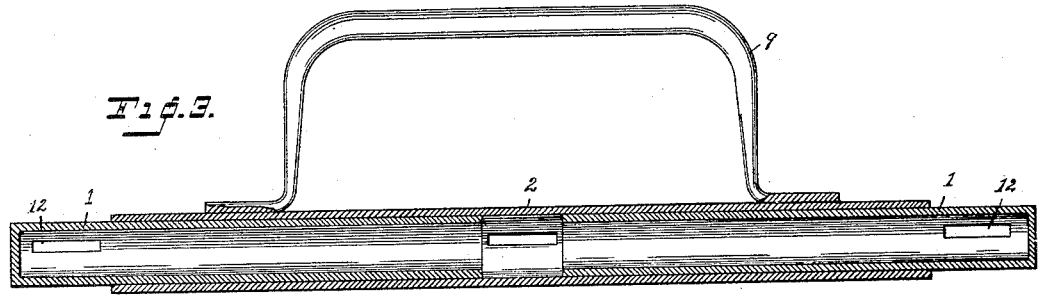
Witnesses
C. M. Newman,
A. P. Munson.
Inventor
George M. Morris
By H. M. Wooster
Atty.

UNITED STATES PATENT OFFICE.

GEORGE M. MORRIS, OF BRIDGEPORT, CONNECTICUT, ASSIGNOR TO EDWARD S. HOTCHKISS, OF SAME PLACE.

STRAP-HOLDER FOR PARCELS.

SPECIFICATION forming part of Letters Patent No. 424,806, dated April 1, 1890.

Application filed June 20, 1889. Serial No. 314,971. (No model.)

*To all whom it may concern:*

Be it known that I, GEORGE M. MORRIS, a citizen of the United States, residing at Bridgeport, in the county of Fairfield and State of Connecticut, have invented certain new and useful Improvements in Strap-Holders for Parcels; and I do hereby declare the following to be a full, clear, and exact description of the invention, such as will enable others skilled in the art to which it appertains to make and use the same.

My invention has for its object to produce a simple, easily-operated, and inexpensive strap-holder which may be readily adjusted to various sizes of parcels.

With these ends in view I have devised the simple and novel construction of which the following description, in connection with the accompanying drawings, is a specification, numbers being used to denote the several parts.

Figure 1 is a side elevation, the straps being in section, and Fig. 2 a plan view, of the preferred form of my novel device, the handle being removed; and Fig. 3 is a longitudinal section, portions thereof being in elevation, of another form in which I have carried my invention into effect.

The device consists, essentially, of two slides, which I have designated by 1, and a handle-carrier, designated by 2. In the form illustrated in Figs. 1 and 2 the slides consist of two parallel rods connected together at their outer ends. The slides may be made from a continuous piece of wire bent to the required shape, or, as shown in the drawings, two independent rods may be used and their ends connected by cross-pieces 3, which are provided on their upper sides with loops 4 to receive straps 5, the straps being adapted to slide freely in said loops in the ordinary manner. At the inner ends of each pair of rods comprising the slides are eyes 6, each of said eyes being rigidly connected to one of the slides and inclosing one of the rods of the other slide, so that the rods will slide through said eyes. In order that this construction may be clearly understood, I have designated the right slide in Fig. 2 as $1^a$ and the left slide as $1^b$, and the eyes upon the right slide as $6^a$ and the eyes upon the left slide as $6^b$. Eyes $6^a$ are rigidly attached to slide $1^a$ and inclose the rods comprising slide $1^b$, permitting the rods to slide in said eyes, eyes $6^b$ being rigidly attached to slide $1^b$ and inclosing the rods comprising the other slide in the same manner. In practice the eyes are made to inclose the rods tightly enough so that, while the slides may be moved when desired without difficulty, they will remain in any position in which they may be placed. In this form the handle-carrier consists of a cross-piece 7 and a strip 8, to which the handle 9 is connected. The cross-piece and strip may be formed from a single piece of metal. In practice, however, the cross-piece is preferably made of ordinary sheet metal and so formed as to inclose the four rods comprising the slides, the metal being closed together at the center, as indicated in dotted lines in Fig. 2, so as to hold both of the slides against lateral movement. This cross-piece is ordinarily provided with a loop 4 to receive a central strip, which, however, may or may not be used, as preferred. Strip 8 is made considerably longer than cross-piece 7, and is provided at its ends with lips 10, adapted to inclose the rods comprising the slides, as is clearly shown in Fig. 2. The function of this strip is to brace and strengthen the device in use by giving an extended bearing under the slides, lateral movement being prevented by the engagement of the lips with the slides. The strip is preferably made of spring metal, so that the ends thereof will spring downward below the plane of the slides when not in use, as is clearly shown in Fig. 1, thereby preventing lips 10 from engaging eyes 6 when the slides are drawn out to elongate the strap-holder. The handle is connected to the strip in any suitable manner, ordinarily by being pivoted to upturned flanges 11 at the ends of the strip, as shown in Figs. 1 and 2.

In the form shown in Fig. 3 the handle-carrier is a tube and the slides are both made tubular and slide within it, and instead of passing the straps through loops the two outer ones are passed through slots 12 at the ends of the slide, and the central strap, if used, is passed through a similar slot in the handle-carrier.

Having thus described my invention, I claim—

1. A strap-holder for parcels, consisting of a carrier and rods sliding within said carrier, said rods being connected together at their outer ends and provided at their inner ends with eyes, each of which incloses a rod of the opposite slide.

2. A strap-holder consisting of a pair of slides, a carrier by which said slides are held and to which the handle is connected, said slides consisting of parallel rods connected by cross-pieces at their outer ends and having at their inner ends eyes, each of which is secured to one rod and incloses one of the rods of the other slide, substantially as described.

3. A strap-holder consisting of a carrier to which the handle is attached, slides adapted to move therein, and a longitudinal spring-strip extending from the carrier and having lips 10 at its ends, said strip acting to support the carrier and the lips to engage the slides when in use, and said strip and lips springing down below the plane of the slides when not in use, so that the slides may be extended.

4. The slides consisting of rods, cross-pieces connecting said rods at their outer ends and having loops for the straps, and eyes, each of which is secured to the end of one of the rods and incloses a rod of the other slide, in combination with the handle-carrier consisting of a cross-piece inclosing the rods and a spring-strip attached to the cross-piece and having at its outer ends lips adapted to engage the outer sides of the rods, and flanges to which the handle is connected.

In testimony whereof I affix my signature in presence of two witnesses.

GEORGE M. MORRIS.

Witnesses:
A. M. WOOSTER,
ARLEY I. MUNSON.